United States Patent [19]

Apuzzo et al.

[11] 4,290,655
[45] Sep. 22, 1981

[54] SINTERED SELF LUBRICATING BEARINGS

[75] Inventors: Gennaro Apuzzo; Gian F. Bocchini, both of Naples, Italy

[73] Assignee: Merisinter S.p.A., Arzano, Italy

[21] Appl. No.: 39,569

[22] Filed: May 15, 1979

[30] Foreign Application Priority Data

Jun. 6, 1978 [IT] Italy .................. 49737 A/78

[51] Int. Cl.³ .................. F16C 17/02; F16C 33/10
[52] U.S. Cl. .................. 308/121; 308/240; 308/DIG. 5
[58] Field of Search .................. 308/78, 121, 239, 240, 308/DIG. 5

[56] References Cited

U.S. PATENT DOCUMENTS 2,227,307 12/1940 Hildabolt .................. 308/240
2,698,774 1/1955 Haller et al. .................. 308/DIG. 5
2,894,792 7/1959 Brilli .................. 308/240
3,046,068 7/1962 Sternlicht .................. 308/240
3,140,131 7/1964 Tann .................. 308/240

FOREIGN PATENT DOCUMENTS 1285793 12/1968 Fed. Rep. of Germany ... 308/DIG. 5

Primary Examiner—Richard R. Stearns
Attorney, Agent, or Firm—Michael J. Striker

[57] ABSTRACT

A sintered self lubricating bearing comprising at least an area of the inner surface, with a permeability value reduced in respect to that of the remaining mass, the number of reduced permeability areas varying from one to two times the numerical value of the diameter expressed in millimeters.

4 Claims, 2 Drawing Figures

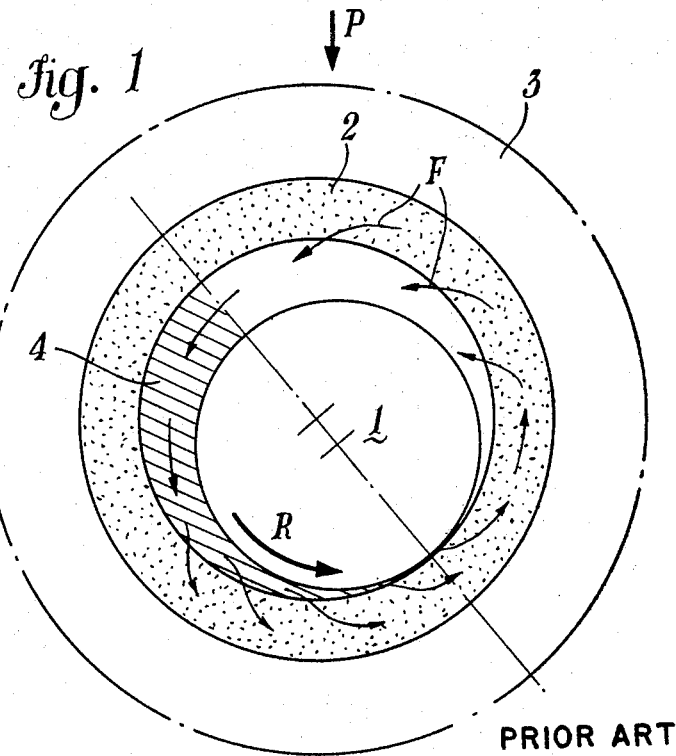
fig. 1 — PRIOR ART
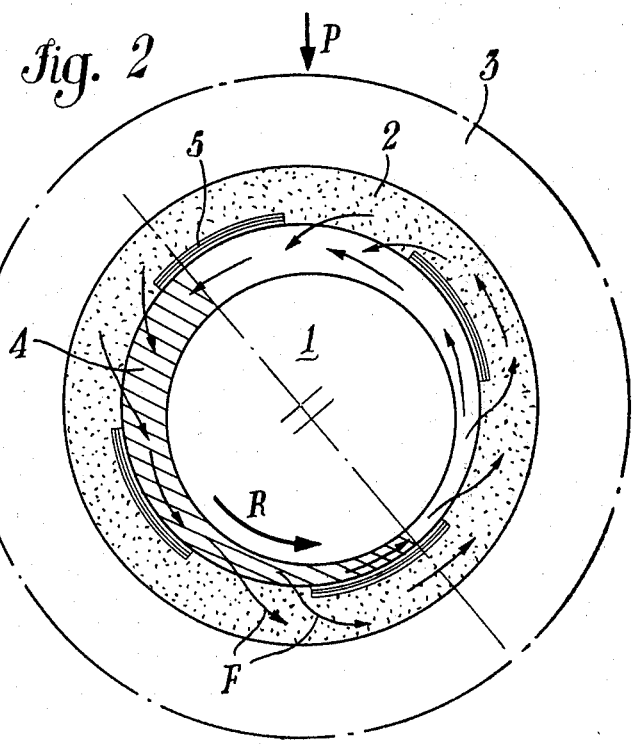
fig. 2

SINTERED SELF LUBRICATING BEARINGS

BACKGROUND OF THE INVENTION

The present invention concerns an improvement in sintered self lubricating bearings.

As known, the usual method of dimensioning of sintered self lubricating bearings is based upon the maximum admissible value of the product p·v wherein p is the acting pressure, as defined by the ratio between the load and the surface projected by the bush (inner diameter×length), and v is the peripheral velocity of the shaft.

The existence of a maximum value of such product p·v is a direct consequence of the existence of a surface porosity, in the inner wall of the bearings, which does not allow the build-up of a continuous film of lubricant in many cases wherein the average pressures exceed determined limit values. In cases of this kind, in fact, the lubricant interposed between the bush and the shaft is pushed towards the bush itself, tends to flow into the pores and therefore is "lost" for the purpose of its sustaining capacity.

On the other hand, the porosity of the bearings is an essential functional character of them, because it allows both the soakage "for life" and the circulation of oil through the walls according to the sense imposed by the pressure differences which are established when functioning.

SUMMARY OF THE INVENTION

An object of the present invention is which can be operated under load to provide an improved lubricating bearing conditions much heavier than the conventional sintered self-lubricating bearings.

According to the present invention, some definite extension areas both in a circumferential direction and in a radial direction are provided on the inner wall of the bearing where permeability lower than the average of the bearing itself is obtained; the extension of such areas in the axial direction being variable, with respect to the total length, from a value of 0.4 to 1, while they may assume any position.

The present invention will now be described with reference to the attached drawings, which represent an illustrative but not limitative preferred embodiment of the invention itself.

BRIEF DESCRIPTION OF THE DRAWINGS

FIG. 1 represents schematically a conventional sintered bearing, seen in section along a plane normal to the axis;

FIG. 2 is a view similar to FIG. 1, showing the bearing according to the present invention.

DETAILED DESCRIPTION OF THE PREFERRED EMBODIMENT

With reference to FIG. 1, number 1 indicates the shaft rotating in the sense indicated by arrow R, 2 is a sintered bush, inserted in a seating 3; P indicates the direction of action of the load, while the oil flow is indicated by arrows F. Zone 4, shown by the hatched area, is the one wherein the oil sucked in by bush 2, progressively as the pressure increases, introduces itself again into the porous surface of the bush itself, so that in the area of maximum pressure, the lubricant film interposed between shaft 1 and bush 2 is lacking.

According to the present invention (FIG. 2), it is provided to establish a certain number of reduced permeability areas, indicated by 5, symmetrically distributed on the inner surface of bush 2. Areas 5 have the intent of preventing the oil penetrating into the porous mass, thus allowing the formation of a continuous film of lubricant, where shaft 1 "floats".

The number of such areas 5 may vary from 1 to 2 times the numerical value of the size of the hole diameter expressed in mm; according to the characteristics, as a whole, of the shaft-bearing group, such as:

the shaft diameter;
the constancy or not of the load position;
the constancy or not of the rotation direction;
the constancy or not of the peripheral velocity;
the possibility of assembling the bearing in the seating with a fixed positioning with respect to the plane of action of the load;
the wall thickness of the bearing.

The ratio between the value of the "reduced" local permeability and the value of the "normal" local permeability, may vary from 0.05 to 0.95.

The definition of the number of the reduced permeability areas and of the ratio among the local permeabilities is bound to the examination of the functional parameters; however it is always possible to realize some values of the p·v product admissible, superior up to at least 3 times in respect to the value suggested by the national and international specifications currently existing.

The sintered materials which lend themselves to the realization of bearings of the type considered in the present invention, are:

iron and its alloys;
steel of any formulation, including stainless steels;
copper alloys;
aluminium, zinc and their respective alloys.

The manufacture method does not substantially differ from those usually adopted in powder metallurgy and comprises the following phases:

pressing, with a properly shaped core, in such a way as to realize an inner profile of the bearing "in steps" of an assigned difference in height, comprised between 0.01 mm and 2 mm, depending on the geometrical characteristics of the bearing and on the anticipated operational conditions;

sintering, under conditions defined by the type of chosen material;

sizing in a mold with annular and circular shaped elements;

soaking in lubricating oil having characteristics chosen on the base of the functional and constructional specifications of the whole.

The soaking operation can be effected even before the sizing.

The obtainable dimensional precision is high and such as to guarantee the fulfilment of tolerance classes ISO 5, or ISO 6, or ISO 7, or ISO 8, according to the needs, on all diametral dimensions.

The present invention has been described according to a preferred embodiment thereof, but it is intended that executive variations may be effected in practice by the branch expert without departing from the protection limit of the present industrial patent.

Having thus described the present invention what is claimed is:

1. A sintered self-lubricating bearing, comprising a sleeve of a porous material of a predetermined permeability having a central opening to receive a rotatable shaft, said opening defining an inner surface; and a plurality of areas of a relatively small thickness located on said inner surface, said areas being equally spaced from each other in a circumferential direction and axially extended along an axis of elongation of said sleeve, and having a permeability lower than that of said porous material of said sleeve, whereby said areas reduce the penetration of the lubricating oil into said porous material of said sleeve in the region of maximum pressure and also allow a free circulation of oil within the whole porous sleeve.

2. The bearing of claim 1, wherein the ratio between the permeabilities of said areas and said porous material of said sleeve is in the range between 0.05 and 0.95.

3. The bearing of claim 1, wherein the ratio between said axial extension of said areas and the axial length of said sleeve is in the range between 0.4 and 1.

4. The bearing of claim 1, wherein the number of said areas is in the range from one to two times the diameter of said inner opening defined in millimeters.

* * * * *